United States Patent [19]

Herzig

[11] Patent Number: 4,723,099
[45] Date of Patent: Feb. 2, 1988

[54] DRIVE FOR A SWITCH

[75] Inventor: Peter Herzig, Aarau, Switzerland

[73] Assignee: BBC Brown, Boveri & Company Limited, Switzerland

[21] Appl. No.: 801,748

[22] Filed: Nov. 26, 1985

[30] Foreign Application Priority Data

Dec. 3, 1984 [CH] Switzerland ............... 5743/84

[51] Int. Cl.⁴ ............................................. H02K 7/02
[52] U.S. Cl. .................................... 318/161; 318/150; 307/140
[58] Field of Search ............... 318/161, 250, 150, 251, 318/375, 299, 528; 307/102, 119, 139–140

[56] References Cited

U.S. PATENT DOCUMENTS

| | | | |
|---|---|---|---|
| 4,030,007 | 6/1977 | Price | 318/744 |
| 4,086,983 | 5/1978 | Anzai | 318/250 |

*Primary Examiner*—William M. Shoop, Jr.
*Assistant Examiner*—Patrick C. Keane
*Attorney, Agent, or Firm*—Ostrolenk, Faber, Gerb & Soffen

[57] ABSTRACT

A drive for a high-voltage isolating switch includes a shaft which acts on a moving contact of the isolating switch, a flywheel which is connected via a coupling to the shaft, a drive motor for energizing the flywheel before a switching process begins and a control circuit. The control circuit is used for determining the direction of rotation of the drive motor during the energizing process and for automatically switching the drive motor from a motor to a generator operation, during a period when the movable contact is to be moved. The motor is preferably a series-wound motor which provides high operational reliability. A rectifier is connected in the current path between the rotor and stator windings of the motor. The rectifier stabilizes the current direction in the stator winding during the switching-over phase of the drive motor from motor to generator operation.

16 Claims, 1 Drawing Figure

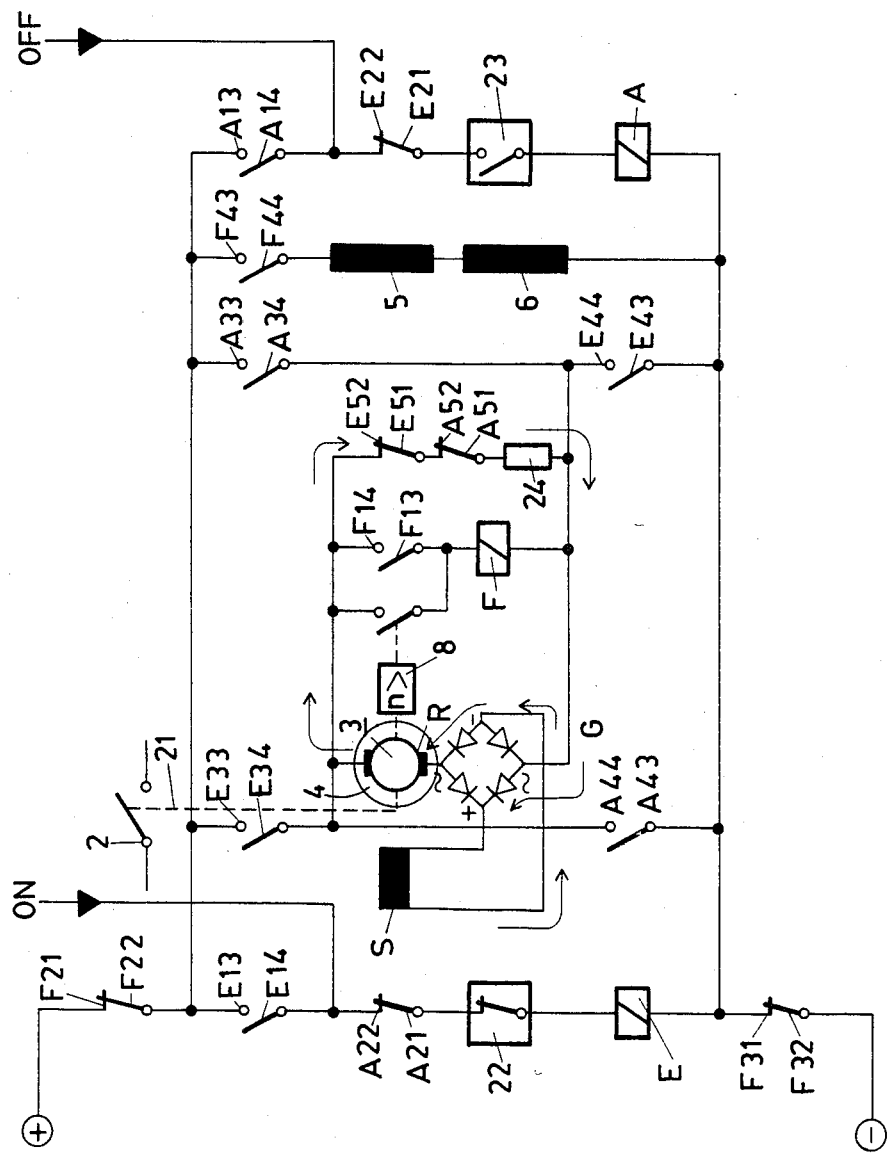

DRIVE FOR A SWITCH

BACKGROUND AND SUMMARY OF THE INVENTION

The present invention is directed to a drive mechanism for a high voltage switch.

The invention deals with the subject matter described in the prior German Patent Application No. P 34 13 793.9. A drive described in that application requires a comparatively elaborate permanent magnet motor. If a series-wound motor is used instead of a permanent magnet motor, the occurrence of a current gap may impair the operability of the control circuit because of the spurious dropping-out of control contactors, a condition which must be avoided with additional auxiliary electric accumulators when switching from motor to generator operation.

The present invention provides a drive of the generic type, which is distinguished by its high operational reliability, and by a rugged and inexpensive drive motor.

The drive according to the invention is marked by the fact that it is always possible in a simple and reliable manner, even with a drive motor constructed as a series-wound motor, to complete a switching process once it has been initiated. Additional auxiliary electric energy storage devices such as accumulators or electrolytic capacitors are not required.

In the text which follows, the invention is explained in greater detail with the aid of an illustrative embodiment which is described in the drawing, in which the single figure essentially shows the control circuit of the drive according to the invention.

BRIEF DESCRIPTION OF THE DRAWINGS

The sole FIGURE depicts a preferred embodiment of the present invention.

DETAILED DESCRIPTION

In the FIGURE, a drive motor 3 is shown which is rigidly connected to a flywheel 4. The flywheel can be non-positively connected via an electro-magnetic coupling 5 to a switching shaft 21 which is symbolically represented in the FIGURE and which acts on a moving contact of an isolating switch 2. The drive motor 3 can be connected to a direct current source via a contactor E, which responds during the switching-on phase of the isolating switch 2 in the kinetic charging phase, with contacts E13/14, E21/22, E33/34, E43/44 and E51/52, and a contactor A, which responds during the switching-off of the isolating switch 2, with contacts A13/14, A21/22, A33/34, A43/44 and A51/52. In parallel to drive motor 3 there appear a breaking resistor 24 and a contactor F having contacts F13/14, F21/22, F31/32 and F43/44. The exciter element of contactor F is preceded by a centrifugal switch 8 which is actuated when a presetable releasing speed of the drive motor 3 is exceeded. The exciter elements of contactors E and A are respectively preceded by limit switches 22 and 23. An electromagnetic locking brake 6, which is preferably constructed as an electromagnetically held permanent magnet locking brake and which acts on the switching shaft 21, is connected in series with the electromagnetic coupling 5.

The drive motor 3 is a series-wound motor having series-connected windings. A rectifier G, which is constructed as a Graetz rectifier or a full-wave circuit, is connected in the current path between rotor winding R and stator winding S. This rectifier is preferably provided with avalanche diodes to protect it against overvoltages. The direct-current outputs of rectifier G are connected to the stator winding S and and its alternating-current input is connected between the connection, which can be connected to the stator winding S, of the rotor winding R and one pole of the direct-current source.

The drive operates as follows: if the isolating switch 2 is open, as shown in the FIGURE, the switching-on process is initiated by activating a switching-on command to the "ON" position. Contactor E responds to the command and latches via its contact E13/14. At the same time, contacts E33/34 and E43/44 close and contacts E21/22 and E51/52 open. The result of the closing of contacts E33/34 and E43/44 is that the direct-current source acts via contacts F21/22 and E33/34 and F31/32 and E43/44 on the drive motor 3 and the flywheel is charged up. The opening of the contact E21/22 guarantees that opposing commands are reliably blocked during this charging process while the opening of the contact E51/52 causes the breaking resistor 24 to be switched out of the current path.

As soon as a predetermined releasing speed of the drive motor 3 and thus of the flywheel has been reached, the centrifugal switch 8 closes and the exciter element of the contactor F is activated which causes the contacts F13/14 and F43/44 to be closed and the contacts F21/22 and F31/32 to be opened. The closing of the contact F13/14 causes the contactor F to latch while the closing of the contact F43/44 causes the locking brake 6 to be released and the coupling 5 to be actuated. As a result, the flywheel acts directly on the switching shaft of the isolating switch 2 and forces the latter to switch on.

The opening of contacts F21/22 and F31/32 causes the direct-current source to be disconnected from the drive motor 3 and the control circuit during the switching process. As a result, drive motor 3 is switched from motor to generator operation. To achieve this switching-over in a series-wound motor automatically in a manner which does not produce current gaps, rectifier G, which stabilizes the current direction in the stator winding S during this switching-over process, is connected into the current path between rotor winding R and stator winding S. In this arrangement, the self-induction current of the stator winding is short circuited via the bridge branches of rectifier G, independent of the direction of rotation, and the magnetic field already existing during motor operation, is maintained in a quasi-stationary manner. Since this strong magnetic field is thus immediately available at the moment of disconnecting the direct-current source, the drive motor 3, which is constructed as a series-wound motor, can act as generator even during the switching-over from motor to generator operation and can supply current in a non-gap-producing manner for supplying the control circuit and the electro-magnetic coupling 5 and locking brake 6. As a result, a dropping off of the contactors and the non-functioning of coupling 5 and locking brake 6 without additional measure such as electric energy stores is avoided and the isolating switch 2 can be reliably moved into the on position.

During the switching-over from motor to generator operation, the current flow in the stator winding S is not only stabilized but also carried away to the outside under active compulsion by the rectifier G. As shown by the arrows, the current flows from the stator winding S via one bridge branch of the rectifier, the rotor winding R, the contacts E51/52, A51/52 and finally through another bridge branch of the rectifier G back to stator winding S. The stabilization of the current direction causes the polarity of the stator winding S to be maintained while the current direction reverses in the rotor winding R during the transition from motor to generator operation (under compulsory guidance by the rectifier G). During this process, the reverse dynamo voltage appears which is masked by the applied voltage in the rotor winding in the motor operation.

Thus, the rectifier G compels the current to change direction in the rotor winding R during the switching-over process from motor to generator operation. Further, it enables the series circuit of rotor R and stator winding S to have the correct polarity towards the outside, and ensures that the magnetic excitation field does not collapse, because of the equivalence of rotor winding R and stator winding S, and must be built up again if one magnetically predominates, but that the magnetic field and induction winding are defined from the start.

As a result, an essential objective is achieved in that the switching process proceeds independently of the external power supply right from the start. Another objective is achieved in that the repolarization of stator or rotor winding is carried out automatically and virtually without delay and a winding switching contactor and its drive system can be omitted.

As soon as the isolating switching 2 has reached its switched-on position, the limit switch 22 opens and the contactor E drops off. As a result of the concurrent opening of contacts E33/34 and E43/44, the drive motor 3, which now acts as generator, is disconnected from the electromagnetic coupling 5 and from locking brake 6. The coupling 5 is de-excited and breaks the connection from the flywheel to the switching shaft 21 while the switching shaft 21 is blocked by the locking brake which now responds and the isolating switch is simultaneously held in its switched-on position. Due to the closing of the contact E51/52, effected by the dropping-off of the contactor E, the drive motor 3, which is still operating as generator, is electrically strongly decelerated by the braking resistor 24 and kinetically discharged. After a few seconds, is available again for the switching-off process which requires an opposite speed of motor revolution.

During the switching-off operation, the contactor A is activated in response to a switching-off command "OFF". This causes drive motor 3 to be connected via the now-closed contacts A33/34 and A43/44 to the direct-current source and as a result the drive motor 3 is switched on and the flywheel store is charged up. The contacts E33/34, E43/44, A33/34 and A43/44 are arranged in a bridge circuit in such a manner that the direct-current source, during the switching-off process, acts with reversed polarity on the drive motor 3 so that its direction of rotation and thus also the direction of rotation of the flywheel store is in an opposite direction of rotation to that which is established during the switching-on process. The flywheel store, after the charging-up process, reliably carries the isolating switch 2 into the switched-off position, in a manner similar to the switching-on process.

What is claimed is:

1. A driving mechanism for moving a movable contact of an electrical switch, said driving mechanism comprising:
    a shaft coupled to the moving contact for moving the moving contact between ON and OFF positions of the moving contact;
    a flywheel controllably coupled to the shaft for selectively moving the shaft between the ON and OFF positions;
    a motor coupled to the flywheel and effective for accelerating the flywheel to impart energy thereto and means for applying a power source to the motor during an initial period when the motor drives the flywheel;
    an electrically operable coupling between the flywheel and the shaft;
    means for operating said motor has a generator during a subsequent period and for powering said coupling from electrical power derived from said motor in a manner which is effective to couple the flywheel to the shaft; and
    means for deactivating the coupling so that the flywheel is uncoupled from the shaft when the movable contact reaches one or the other of said ON and OFF positions.

2. The driving mechanism of claim 1, in which the motor is a series-wound motor having series-connected rotor and stator windings.

3. The driving mechanism of claim 2, wherein said means for applying a power source comprises means for applying a direct current across said windings, said motor further comprising means for maintaining the current flow direction through one of said windings constant irrespective of the polarity of the direct current source.

4. The driving mechanism of claim 3, wherein the means for maintaining the current flow direction constant comprises a rectifier bridge.

5. The driving mechanism of claim 4, in which the rectifier bridge circuit is comprised of avalanche diodes.

6. The driving mechanism of claim 4, in which the rectifier bridge is connected such that the current through the stator winding remains constant and the current through the rotor winding changes according to the polarity of the direct current.

7. The driving mechanism of claim 3, which is effective for providing a continuous, non-interrupted, current flow to said driving mechanism during a period when said power source is disconnected and power begins to flow from said motor.

8. The driving mechanism of claim 2, further comprising a brake coupled to said shaft for braking the motion of the shaft when the movable switch contact has reached one of said ON and OFF positions.

9. The driving mechanism of claim 8, further comprising a dissipative device for dissipating energy stored in the motor at the end of each switching cycle.

10. The driving mechanism of claim 2, further including a first command switch for initiating an ON switching cycle and a second command switch for initiating an OFF switching cycle.

11. A drive for a switch, comprising:
    a switching shaft for actuating a moving contact of said switch;
    a flywheel selectively couplable to the switching shaft and means for discharging the flywheel when the moving contact has reached either an ON position or an OFF position;

a drive motor for accelerating the flywheel during a period before the flywheel is coupled to the switching shaft, the drive motor having series-connected rotor and stator windings;

a control circuit for providing a switching-process-dependent rotation of said drive motor;

a direct current source for supplying direct current to said drive motor and to said control circuit during a first period when said flywheel is driven by said motor;

a contactor for disconnecting said direct current source when the flywheel has reached a predetermined speed, and means for coupling the flywheel to said switching shaft upon reaching said predetermined speed; and stabilization means, connected in the current path between said rotor and said stator windings for stabilizing the direction of current in said stator winding during a second period when said direct current source is disconnected from said driving mechanism and for enabling said drive motor to generate a motor generated direct current and supplying said motor generated current to said control circuit so that current to the control circuit is provided continuously without interruption.

12. A driving mechanism for driving a movable contact of a switch between ON and OFF positions, said driving mechanism comprising:

a shaft coupled to the movable contact to move the movable contact between the ON and OFF positions;

a flywheel and an electrically actuatable coupling for selectively coupling said flywheel to said shaft;

a motor for charging the flywheel, the motor having series-connected rotor and stator windings and a rectifier circuit for assuring that a direct current applied across said windings flows in a single direction in one of said rotor and stator windings irrespective of the polarity of said direct current;

means for applying said direct current to said motor during an initial period for enabling said motor to accelerate said flywheel;

means for disconnecting said direct current from said driving mechanism at the end of said initial period; and means for energizing said coupling with electrical energy generated by said motor.

13. The driving mechanism of claim 12, including a coupling switch and a coupling contact in series with each other and in parallel circuit relationship with said rotor and stator windings, and means for closing the coupling switch when the flywheel has reached a predetermined speed.

14. The driving mechanism of claim 13, further comprising a dissipative element connected in parallel across said windings of said motor for applying a load to and for dissipating energy in said motor after the movable contact has reached either one of the ON and OFF positions.

15. The driving mechanism of claim 14, further comprising an ON command switch for initiating application of said direct current to said motor in a manner which is effective to drive the movable contact to the ON position and an OFF command switch for initiating application of said direct current in a manner which is effective to drive the movable contact to the OFF position.

16. The driving mechanism of claim 15, further comprising means for preventing actuation of either one of the ON and OFF command switches while the other one of said switches is actuated.

* * * * *